(12) United States Patent  
Weiss

(10) Patent No.: US 6,688,569 B1
(45) Date of Patent: Feb. 10, 2004

(54) ADJUSTABLE CLAMP FOR QUICKLY ATTACHING ELEMENTS TO A FRAME

(76) Inventor: Sondra L. Weiss, 2158 Cartwright Pl., Reston, VA (US) 20191

( * ) Notice: Subject to any disclaimer, the term of this patent is extended or adjusted under 35 U.S.C. 154(b) by 0 days.

(21) Appl. No.: 10/265,897

(22) Filed: Oct. 7, 2002

Related U.S. Application Data

(60) Provisional application No. 60/381,991, filed on May 20, 2002.

(51) Int. Cl.[7] .............................................. A47B 96/06
(52) U.S. Cl. ........................... 248/229.15; 248/229.25; 403/321; 403/322.3; 403/328; 269/45
(58) Field of Search .................. 248/229.15, 201, 248/229.25, 354.7, 354.6; 269/43, 45, 96, 97, 6, 171.5, 147; 403/186, 45, 188, 96, 321, 24, 322.1, 322.3, 327, 328, DIG. 6; 256/24, 10.5; 81/487, 152, 180.1

(56) References Cited

U.S. PATENT DOCUMENTS

| | | | |
|---|---|---|---|
| 369,971 A | * | 9/1887 | Stillman |
| 450,474 A | * | 4/1891 | Parker |
| 1,120,798 A | * | 12/1914 | Duecker |
| 1,405,113 A | * | 1/1922 | Gwinn |
| 3,565,380 A | * | 2/1971 | Langren ...................... 248/229 |
| 4,500,077 A | * | 2/1985 | Coxon .......................... 269/45 |
| 6,079,678 A | * | 6/2000 | Schott et al. .......... 248/229.15 |
| 6,550,128 B1 | * | 4/2003 | Lorenz ........................ 29/464 |

FOREIGN PATENT DOCUMENTS

DE     3209984 A1 * 3/1982
DE     4129707 A1 * 9/1991

OTHER PUBLICATIONS

The Pistol–Grip Smooth/Continuous/Clickless Ratchet Action Bar–Clamps; http://www.fools–errant.com/bdsm/nc/ratchet/html.*

* cited by examiner

*Primary Examiner*—Gwendolyn Baxter
(74) *Attorney, Agent, or Firm*—Shoemaker and Mattare

(57) ABSTRACT

A clamping system includes a pair of clamps, each of which can be moved along, and rotated 360° about a common grooved rod. A ratchet mechanism locks each clamp to the rod at selected positions thereon.

2 Claims, 11 Drawing Sheets

ADJUSTABLE CLAMP FOR QUICKLY ATTACHING ELEMENTS TO A FRAME

CROSS-REFERENCE TO RELATED APPLICATION

Provisional application No. 60/381,991, filed May 20, 2002.

BACKGROUND

This invention relates to a clamping system, where the clamps can be moved along a shaft from zero to a fixed maximum distance along the shaft and allow the clamps that are part of the clamping system to rotate 360 degrees on said shaft. This clamping system will permit the temporary attachment of elongated elements, which in most instances have a tubular component, to a transport device. These elongated elements include, but are not limited to medical stands, golf clubs, guns, lamps, etc.

There are a number of inventions that are used to attach medical stands to patient transport devices such as wheelchairs, gurneys, or beds. The Ohanian U.S. Pat. No. 6,179,260 (2001), the Boettger U.S. Pat. No. 5,355,539 (1994), the Scharf U.S. Pat. No. 5,509,680 (1996), the Sheehan U.S. Pat. No. 5,149,036 (1993), the Sims U.S. Pat. No. 5,987,670 (1999), the Schneider U.S. Pat. No. 4,840,391 (1989), the Ambach U.S. Pat. No. 5,897,961 (1999) the Gross U.S. Pat. No. 4,700,922 (1989), and the Wilt U.S. Pat. No. 4,511,157 (1985) describe devices with bases that attaches to a transport device. All of these patents require a modification of the transport device for a clamp to attach to said transport device. For example, in the Ohanian invention, there is an extension arm, terminating with a clamping portion that grasps a medical stand. The clamping portion is attached to a base that is part of a modified transport device. These inventions have other limitations For example, in the Boettger and the Sims inventions their clamping arms cannot be adjusted. This fixes the position of, for example, an attached medical stand very close to the frame of the transport device. The Scharf invention has the opposite problem. The Scharf invention places an attached stand far from the transport device. Placing the attached stand far from the transport device interferes with the movement of the transport device through hallways and in elevators. This arrangement may also place the base of a medical stand in a position that will interfere with pushing the transport device.

Other inventions do not require modification of the transport devices, but the units require some effort to attach a medical stand to the transport device. The Young U.S. Pat. No. 4,969,768 (1990) consists of two metal strips held together by a hinge terminating in clamp ends. Due to this device's lack of adjustability, this device will only attach to a vertical support member on the transport device, and because of its configuration, it will either interfere with pushing the transport device or will make the transport device more difficult to maneuver through a hallway or in an elevator. The Trickett U.S. Pat. No. 5,236,213 (1993), the Kerr U.S. Pat. No. 4,600,209 (1986) and the Burnett U.S. Pat. No. 5,588,166 (1996) do not require a modification of the transport device, but like the Boettger invention, because it cannot be adjusted, the position of the attached medical stand is fixed very close to the frame of the transport device. Again, this arrangement may place the base of the medical stand in a position that will interfere with pushing the transport device.

Other devices such as Pryor U.S. Pat. No. 5,385,324 (1995) and Slone U.S. Pat. No. 6,231,016 (2001) not only require modifications of the transport device, but they also require the transfer of IV bags from a standard medical stand to a clamp based pole having a support for an IV bag or pump.

The present invention is an improvement over prior art because, unlike inventions such as Smith U.S. Pat. No. 5,374,074 (1994) or Gospodarich U.S. Pat. No. 5,597,148 (1997), this invention is simple and quick to attach and remove from objects. Unlike other inventions, this invention does not require any modification of a transport device, and, unlike the Young U.S. Pat. No. 4969,768 (1990), due to its pivoting head, there is no constraint on the clamping surface configuration of the transport device. The present invention is also an improvement over prior art, such as the Boettger U.S. Pat. No. 5,699,988 (1997), because its configuration is quite adjustable, without a loss of strength. Finally, in the present invention, there is no requirement for transferring IV bags or a medical apparatus from one pole to another.

SUMMARY

This invention discloses clamps that can be used to hold elongated objects such as medical stands, golf clubs, etc. Each clamp consists of a holding clamp assembly 2 and an attachment clamp assembly 4 held together by a rod 13. Both the holding clamp assembly and attachment clamp assembly can be moved along said rod 13 and locked into position along said rod 13 by a ratchet assembly 15 or rotated around an axis (the rod 13) to permit the precise attachment to an object.

DRAWING FIGURES

DETAILED DESCRIPTION OF THE PREFERRED EMBODIMENTS

Figure 1:
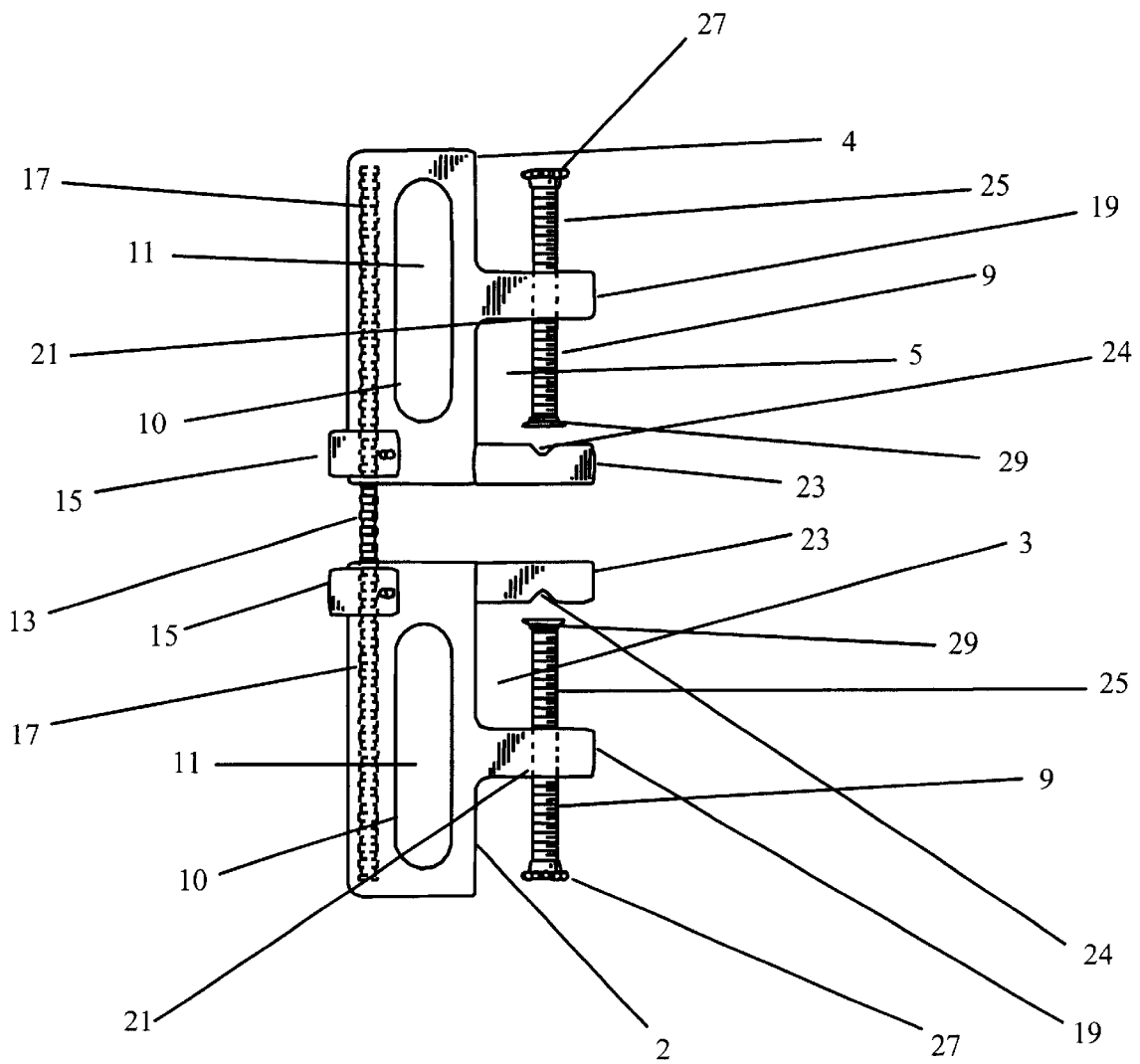
FIG. 1 shows a side view of the invention
Figure 2:
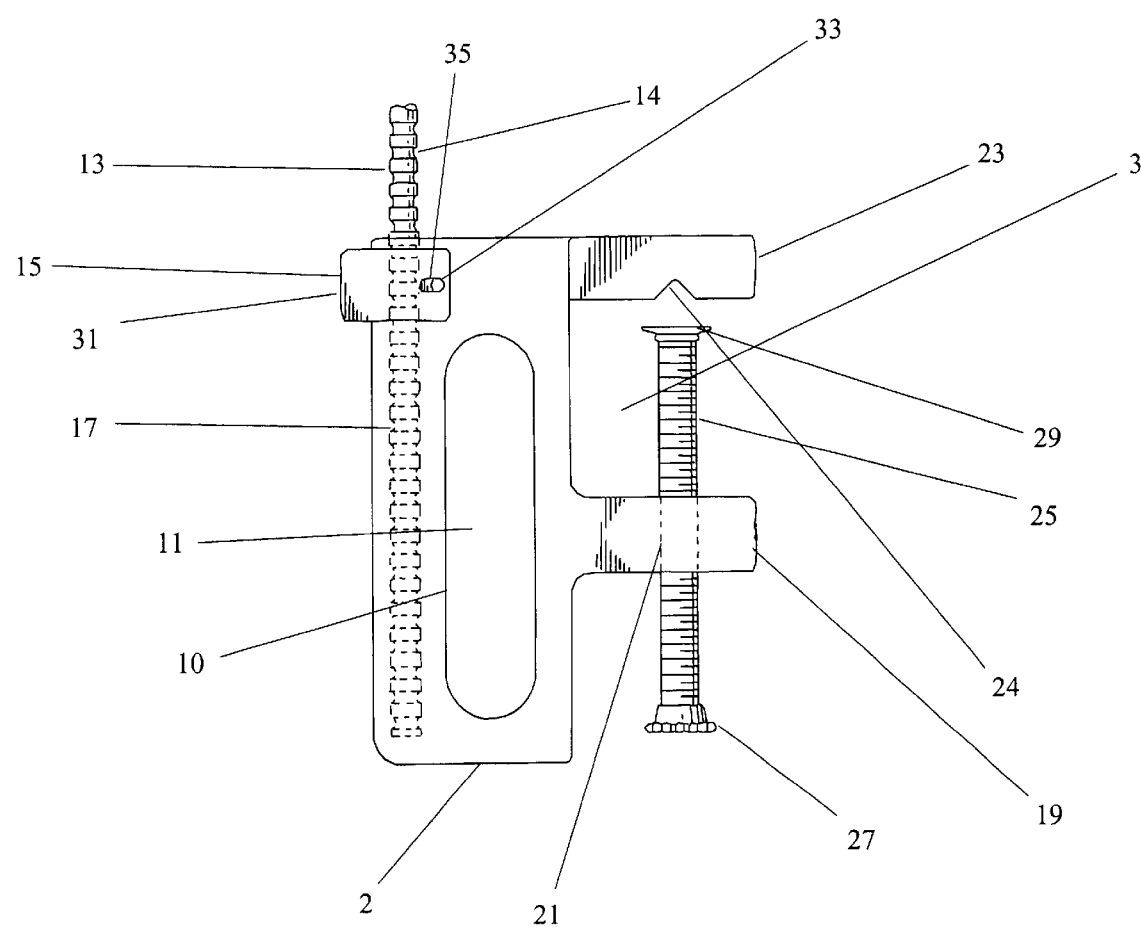
FIG. 2 shows a side view of the holding clamp assembly 4.
Figure 3:
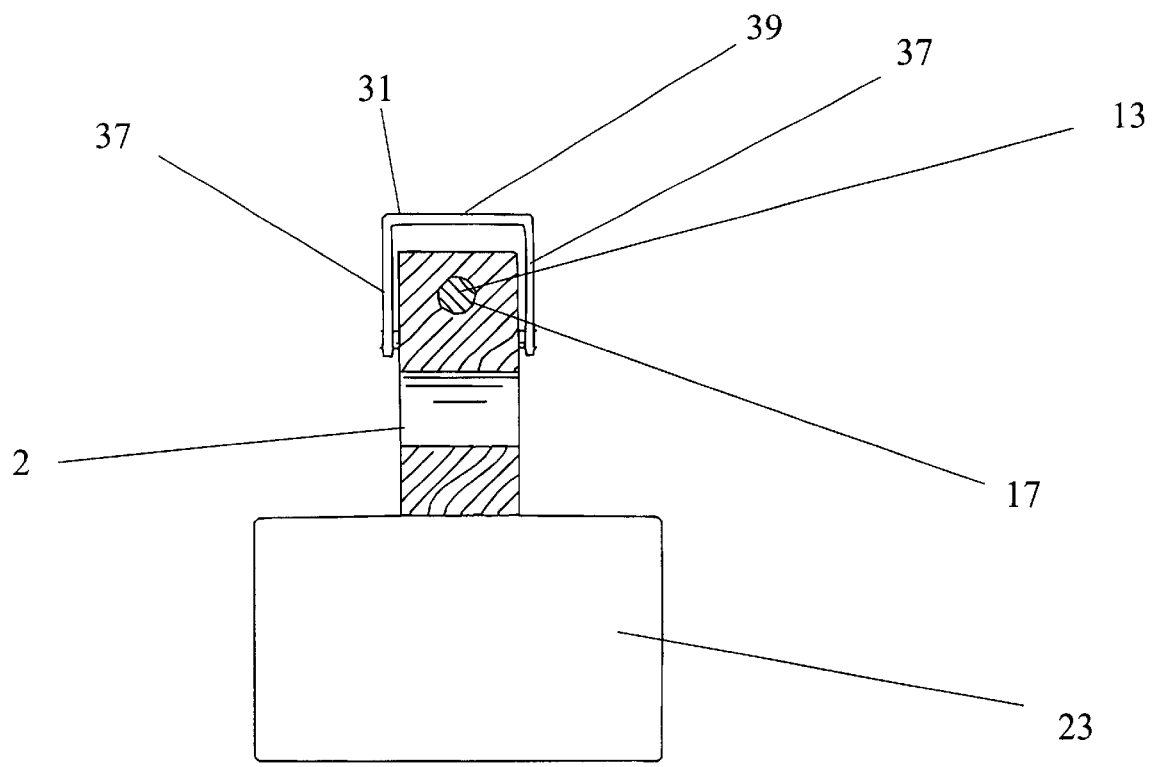
FIG. 3 shows a cross-section of either the holding clamp assembly or the receiving clamp assembly at the clamp handle.
Figure 4:
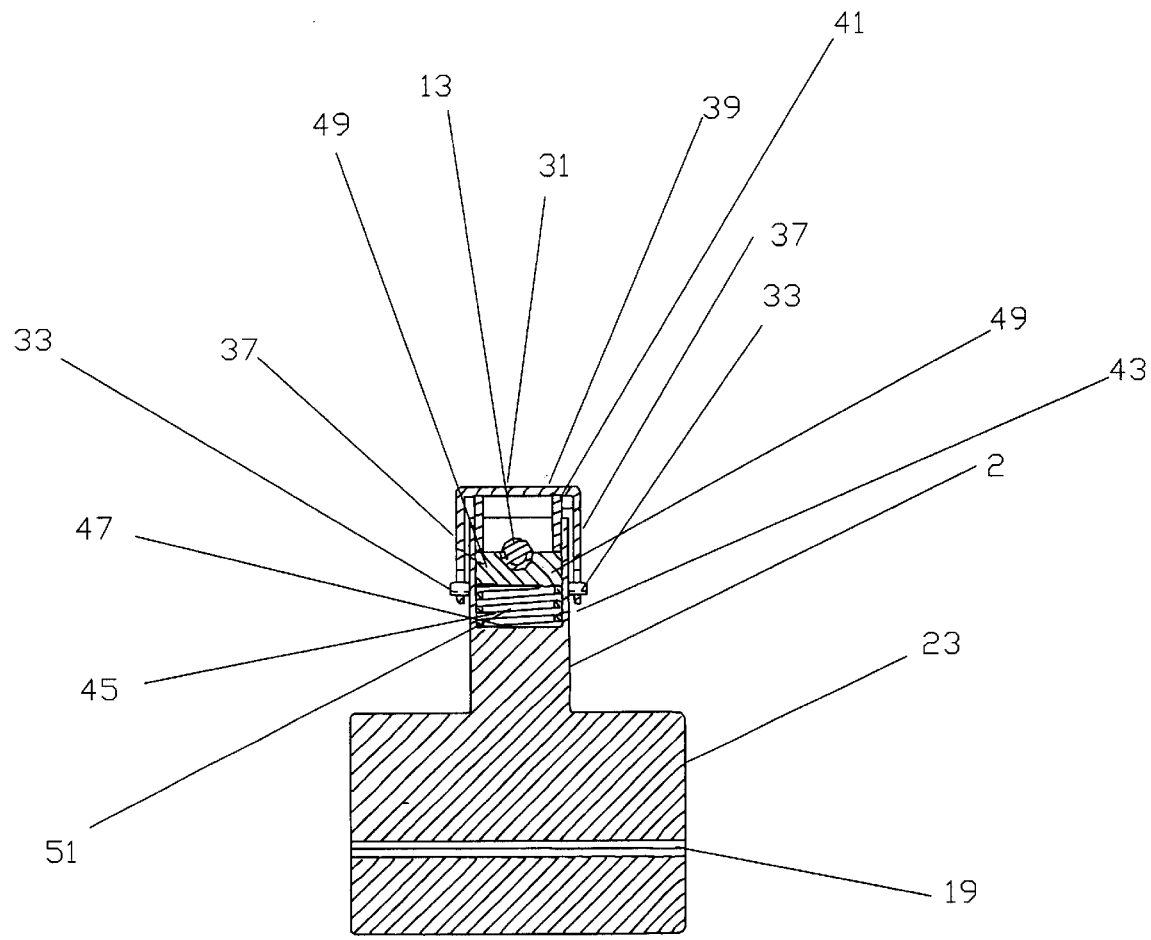
FIG. 4 shows a cross-section of either the holding clamp assembly or the receiving clamp assembly at the ratchet assembly level.

The preferred embodiment of this clamping system is illustrated in FIGS. 1 to 4. The clamping system 1 consists of an attaching clamp assembly 2 with an attaching clamp jaw 3 and a holding clamp assembly 4 with a holding clamp jaw 5. The attaching clamp assembly 2 and the holding clamp assembly 4 can be made of metal, plastic, wood or any other sufficiently stiff material. There are also screws 9.

Figure 7:
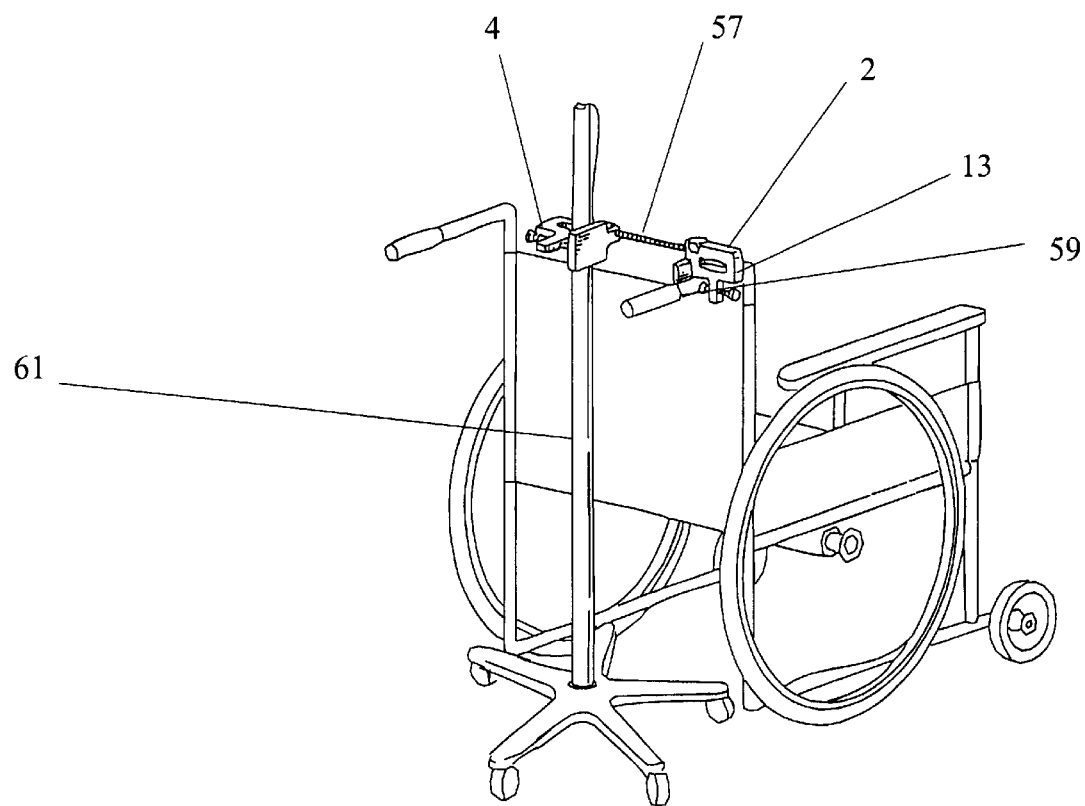
FIG. 7 shows two clamps attaching a medical stand to a wheelchair.
Figure 8A:
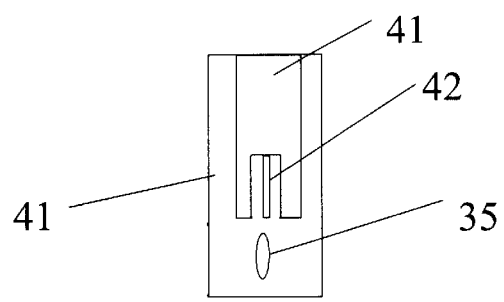
FIG. 8A shows the ratchet assembly component.
Figures 8B, 8C:
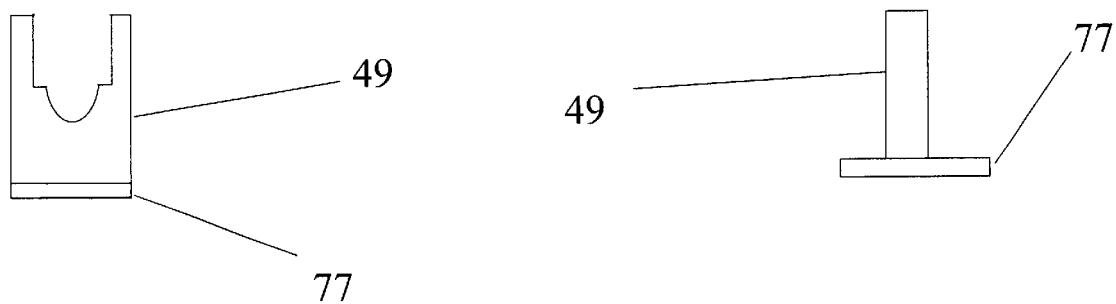
FIG. 8B shows the holding plate (Front View).
FIG. 8C shows the holding plate (Side View).

Each screw 9 consists of a threaded screw shaft 25, a screw adjusting thumb wheel 27 and an object holding cup 29 (in another embodiment, the screw adjusting thumb wheel 27 is not a thumb wheel, it is a knob). Integrated into the attaching clamp assembly 2 and the holding clamp assembly 4 are hand grips 10 formed from the body of the attaching clamp assembly 2 and defined by hand grip openings 11. Both the attaching clamp jaw 3 and the holding clamp jaw 5 have screw holding extensions 19 with threaded screw holding bores 21 for receiving the screw 9 and fixed jaws extensions 23. These fixed jaw extensions 23 may be the same length and width, as in the present embodiment, or different lengths and widths, as in other embodiments. These fixed jaw extensions 23 also can be coated or covered with a non-slip material. For the embodiment of this invention in FIGS. 1 through 11, each fixed jaw extension 23 has v-grooves 24 for securing the clamp to cylindrical objects. In other embodiments a v-groove 24 may not be present. Both the attaching clamp assembly 2 and the holding clamp assembly 4 also have ratchet assemblies 15 that secure the attaching clamp assembly 2 and the holding clamp assembly 4 onto a rod 13 having at least one rod groove 14. The rod 13 passes through the ratchet assemblies 15 and the receiving bores 17 of both the attaching clamp assembly 2 and the holding clamp assembly 4. The rod 13 can be made of metal, wood or plastic. In FIGS. 1 through 4 one can see the ratchet assemblies 15. The Ratchet assemblies 15 consist of a cap 31 that is attached to the rest of the attaching clamp assembly 2 and the holding clamp assembly 4 by two attachment extensions 33, which can be rivets, screws, or lugs. The cap 31 fits over a ratchet assembly seat 43. Each ratchet assembly seat 43 has two ratchet assembly seat distal walls 45 and a ratchet assembly seat base 47. The attachment extensions 33 are located on the surface of the ratchet assembly seat distal walls 45. Each cap 31 consists of a cap releasing side 39, which is pressed to disengage the attaching clamp assembly 2 and the holding clamp assembly 4. The cap 31 also has two cap distal sides 37. Each attachment extension 33 are seated in a channel 35 in each cap distal side 37. These channels 35 can be either elliptical or rectangular and are located on each side of the cap 31 (see also FIG. 8A). This arrangement permits the cap to move up and down within a limited range. The range of movement of each cap is determined by the length of the channels 35. Also attached to or integrated into each cap distal side 37 of the cap 31, are two compression plates 41 (see FIG. 8A) that are attached to the walls of each cap distal side 37. These compression plates 41 engage a holding plate 49 (see FIGS. 8B and 8C) that disengages from a rod groove 14 when the cap releasing side 39 is pressed. The holding plate 49 in the present embodiment is held in place by cap grooves 42 etched in each cap distal side 37 (FIG. 8A). The holding plate 49, unless disengaged from a rod groove 14, will prevent the movement of the clamp bodies along the rod 13. The force necessary to engage the holding plate 49 with a rod groove 14 is supplied by a spring 51. The spring 51 is seated on the ratchet assembly seat base 47 (FIG. 4) and held into position by the two ratchet assembly seat distal walls 45. The spring 51 pushes the holding plate 49 into rod groove 14.

Figure 5:
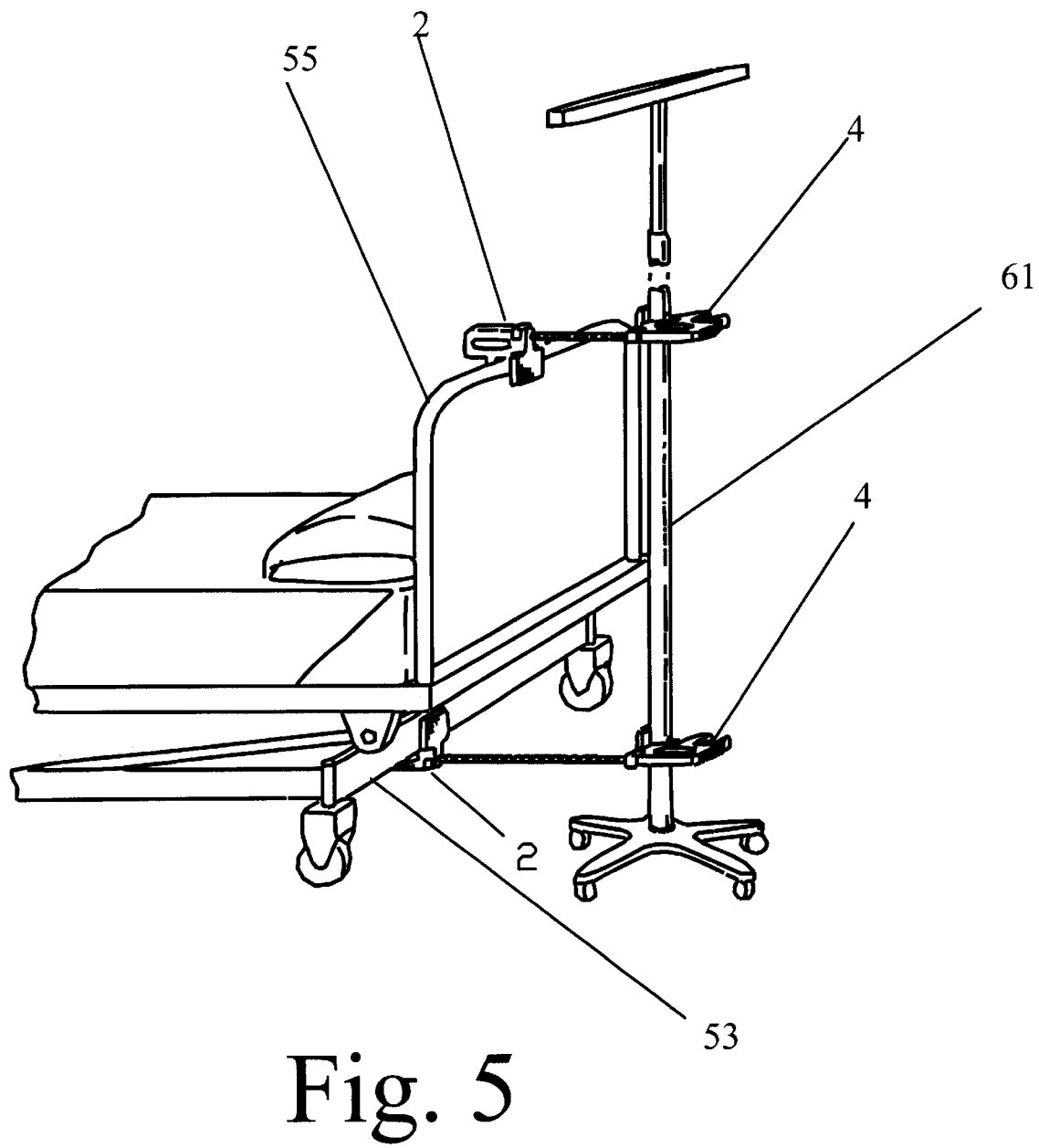
FIG. 5 shows two clamps attaching a medical stand to a bed.
Figure 6:
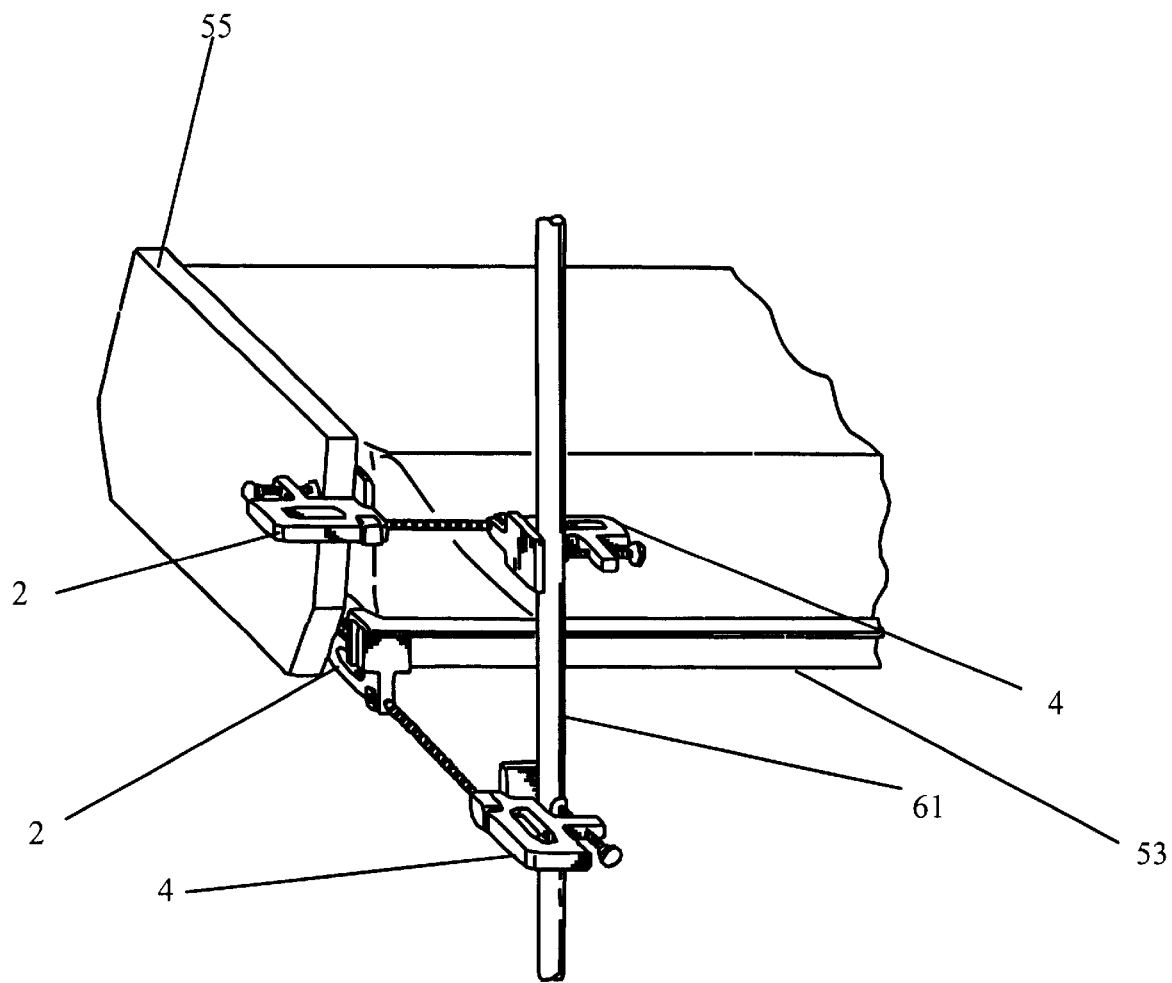
FIG. 6 shows two clamps attaching a medical stand to a gurney.

In FIGS. 5 and 6, the attaching clamp assembly 2 is attached to a bed/gurney frame 53, and to a headboard 55 of a bed/gurney. In FIG. 7, the attaching clamp assembly is attached to a wheelchair handle 59. The attaching clamp assembly can also be attached to the wheelchair frame 57. The holding clamp assembly 4 can be attached to a medical stand 61 or to any other object with a sufficient surface area to be clamped.

Figure 9:
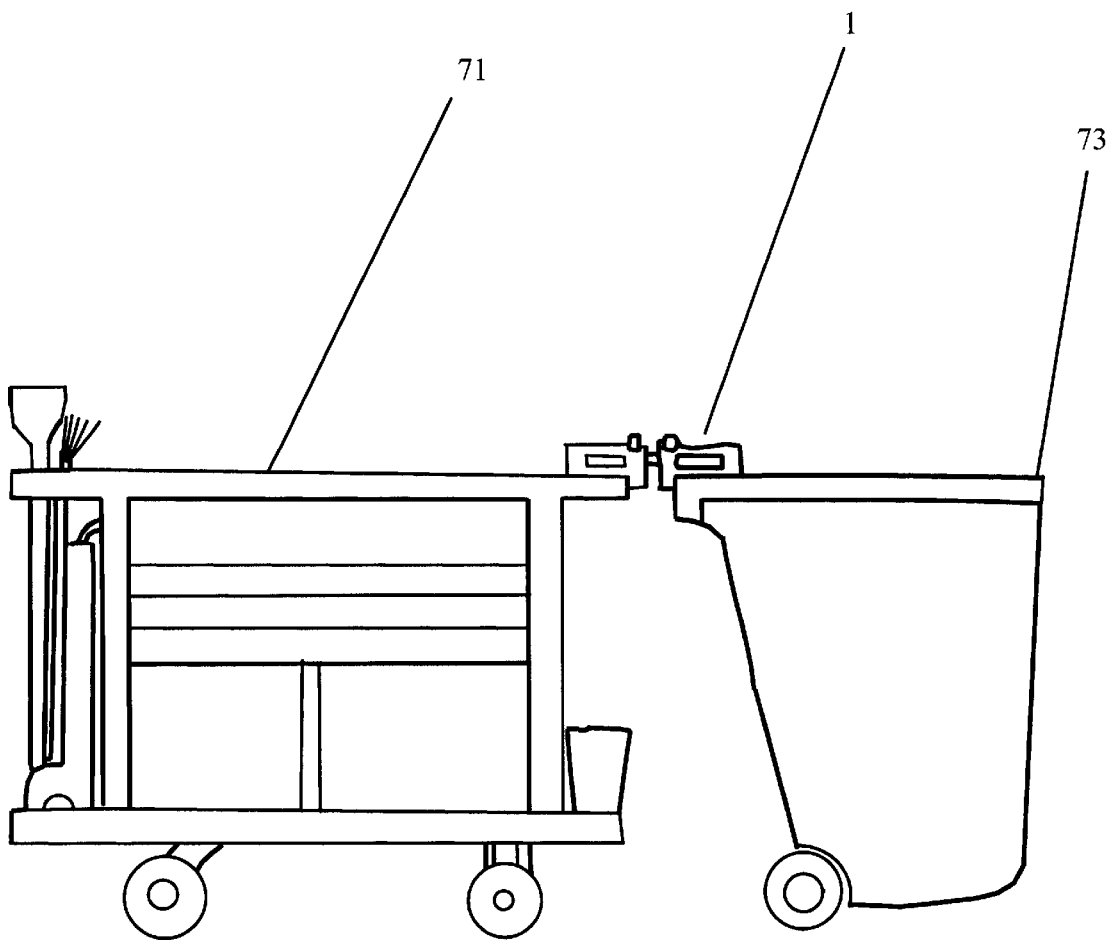
FIG. 9 shows the clamp attaching cart to trash receptacle.
Figure 10:
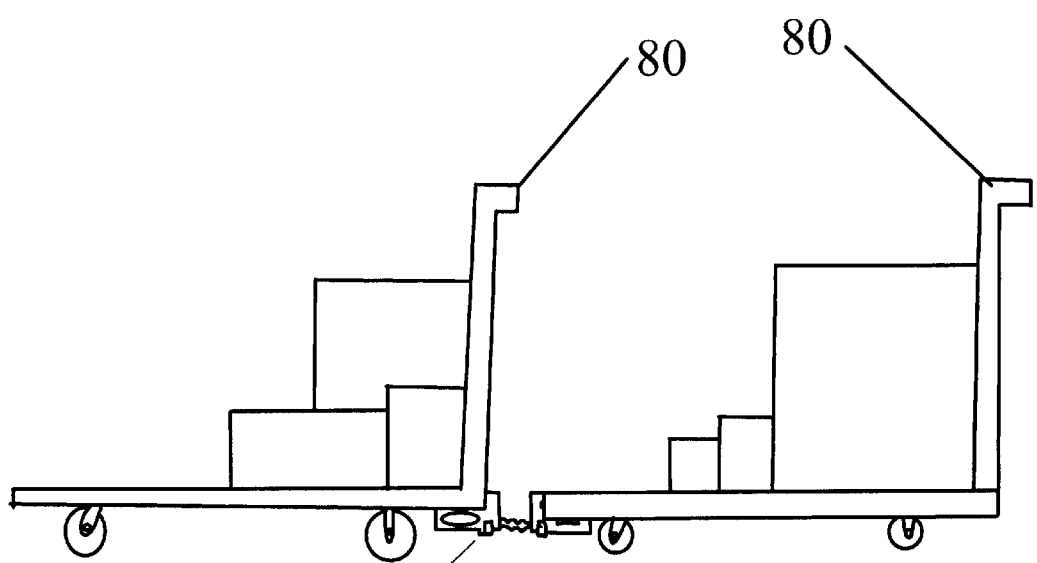
FIG. 10 shows the clamp attaching two carts together.
Figure 11:
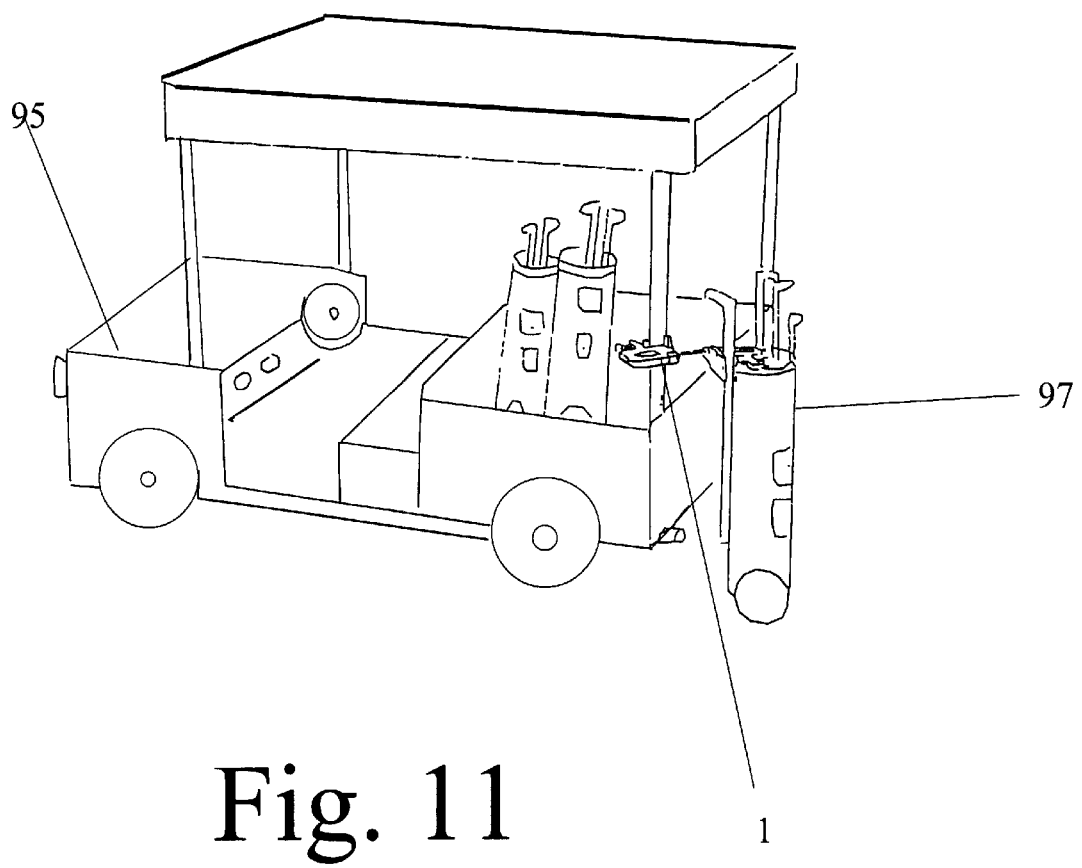
FIG. 11 shows clamp attaching a motorized golf cart to a push golf cart.

One could substitute other objects for the medical stand 61. For example, FIG. 9 shows the clamping system 1 attaching a maintenance cart 71 to a trash receptacle 73. Another example is in FIG. 10. FIG. 10 shows the clamping system 1 attaching two flatbed carts 80 together. Finally, FIG. 11 shows the clamping system 1 attaching a motorized golf cart 95 to a push golf cart 97.

Operation—FIGS. 5 through 11

The invention is simple to operate. The attaching clamp jaw 3 is hooked around an object and the thumb wheel 27 is turned until the screw cup is tightly engaged with the attachment object on one side and fixed jaw extension 23 on the other side. The holding clamp jaw 5 is pivoted on the bar to hook the held object, such as a medical stand 61. The thumb wheel 27 is then turned until the screw cup is tightly engaged between the held object and a fixed jaw extension. The holding clamp assembly 4 can then be adjusted inwardly or outwardly along the rod by pressing the cap releasing side 39 and pushing in or pulling out the holding clamp assembly 4 along rod 13.

Scope of Invention

Although the description above contains many specifics, these should not be construed as limiting the scope of the invention, but as merely providing illustrations of some of the presently preferred embodiments of this invention. For example, the clamp can be made of wood, metal, or plastic. In the present embodiment, screws are used to secure the clamp; however, one could secure an object using a friction based system. The rod in the present embodiment is approximately 30 centimeters; however the rod can be longer or shorter. In the present embodiment, the cap 31 is attached to the attaching clamp assembly 2 and the holding clamp assembly 4 by attachment extensions 33; however, in one embodiment, the cap 31 is held on a holding clamp assembly 4 or an attaching clamp assembly 2 by interlocking ridges located on the cap distal sides 37 and on the two ratchet assembly seat distal walls 45.

As illustrated in FIGS. 9 to 11, one can substitute other objects for a medical stand 61. One can attach many items to each other including, but not limited to, rifles to chairs, brooms or mops to trash receptacles, gardening tools to lawn mowers, etc.

What is claimed is:

1. A clamp comprising an attaching clamp assembly, a holding clamp assembly, a rod passing through bores located inside said attaching clamp assembly and said holding clamp assembly, said rod having grooves, and means for locking said attaching clamp assembly and said holding clamp assembly to said rod at fixed positions, wherein said means for locking said attaching clamp assembly and said holding clamp assembly to said rod at fixed positions is a ratchet assembly through which said rod passes.

2. A clamp as in claim 1, wherein said means for holding an object is a screw integrated into said attaching clamp assembly and/or said holding clamp assembly such that the screw, when turned, compresses an object between the end of said screw and a jaw.

* * * * *